3,422,013
Jan. 14, 1969

3,422,013
PROCESS FOR THE PREPARATION OF NON-NEWTONIAN COLLOIDAL DISPERSE SYSTEMS
Robert W. Scher, Chagrin Falls, Ohio, assignor to The Lubrizol Corporation, Wickliffe, Ohio, a corporation of Ohio
No Drawing. Filed July 7, 1967, Ser. No. 651,688
U.S. Cl. 252—33
Int. Cl. C09k 3/00
14 Claims

ABSTRACT OF THE DISCLOSURE

An improved process for the preparation of non-Newtonian colloidal disperse systems such as are prepared by the treatment of a carbonated, highly basic calcium sulfonate with water. The carbonation of basic calcium sulfonates ordinarily is not carried to the point of complete neutrality because of processing difficulties which arise because of complete carbonation; thus, a somewhat incompletely carbonated metal sulfonate is the usually available material for use in the preparation of certain non-Newtonian colloidal disperse systems. The improvement of this invention consists in carbonating the non-Newtonian product in a fluid medium. That is, the incompletely carbonated calcium sulfonate, for example, is treated with water (or some other treating agent) to form the non-Newtonian product which is fluidized as formed, and then is carbonated. The resulting product is much easier to handle, e.g., to transfer from one container to another, and is a more desirable component for formulation of plastic compositions.

---

This invention relates to non-Newtonian colloidal disperse systems and to a process for preparing the same. In a more particular sense it relates to a process for preparing such non-Newtonian colloidal disperse systems in the presence of a large amount of an inert solvent which can be subsequently removed. The non-Newtonian colloidal disperse systems prepared by the process of this invention are useful as additives in lubricants, asphalts, fuels, cutting oils, caulking compositions, organosols, plastisols and paints.

The preparation of certain thickened mineral oil compositions is described in Patent No. 3,242,079 issued to McMillen. The preparation of these thickened mineral oil compositions is disclosed as involving the treatment of a mineral oil solution of a carbonated basic alkaline earth metal salt of a sulfonic or carboxylic acid having at least twelve aliphatic carbon atoms with a lower aliphatic acid, water or a mixture of water and an alcohol. The process of this invention is an improvement over that disclosed in the McMillen patent and the products of such process are superior in certain respects to the thickened mineral oil compositions of the McMillen patent.

Some of the most serious problems encountered in the preparation of homogeneous thickened compositions such as gels and greases are mechanical in nature. Such compositions are generally prepared by mixing the desired ingredients under conditions which promote the thickening of the solution to the desired viscosity. If homogeneous compositions are to be obtained, the mixing operation must be effective throughout the thickening procedure and this becomes difficult when the solution becomes very viscous. In such instances, expensive heavy-duty mixing equipment is required. Attempts to carry out the thickening procedure in the presence of solvents have been generally unsuccessful. Hence, the usual procedure for preparing gels and greases has involved heating concentrated solutions of the material to be thickened with various compositions which promote the thickening process. One of the features of the process of this invention is the use of a volatile, fluidizing liquid which has the effect of obviating this problem.

Another feature of this invention consists in the carbonation of the process mixtuer after the step of treating the basic metal sulfonate or carboxylate with water, alcohol, etc. The carbonation step results in an improved product.

Accordingly, it is an object of this invention to provide a process for preparing non-Newtonian colloidal disperse systems.

It is also an object of this invention to provide a process for preparing homogeneous thickened compositions.

It is a still further object of this invention to provide a process for preparing thickened compositions without resorting to heavy-duty stirring equipment.

It is a still further object of this invention to provide gels and greases having a high basicity.

It is a still further object of this invention to provide non-Newtonian colloidal disperse systems having improved properties.

These and other objects are attained in accordance with this invention by providing an improved process for converting an oil solution of a partially carbonated basic alkali or Group II metal salt of a sulfonic or carboxylic acid having at least twelve aliphatic carbon atoms into a non-Newtonian colloidal disperse system comprising forming a conversion mixture by contacting said solution with from about 1% to about 80% by weight, based on said metal salt, of a lower aliphatic carboxylic acid, water, alcohol, phenol, ketone, aldehyde, amine, boron acid, phosphorus acid or oxygen, in the presence of a volatile, fluidizing liquid, and carbonating said mixture until the basicity thereof is reduced.

The process is especially applicable to carbonated basic metal salts which have a high metal content, i.e., those having a "metal ratio" of at least about 4.5.

The term "metal ratio" is used herein to designate the ratio of the total chemical equivalents of the metal in the metal salt to the chemical equivalents of the metal which is in the form of a normal salt, i.e., a neutral salt of the organic acid. To illustrate, a metal salt containing five equivalents of the metal per equivalent of the organic acid radical has a metal ratio of 5; and a neutral metal salt has a metal ratio of 1.

The process of this invention can be effected simply by homogenizing, e.g., by vigorous agitation or mixing, the ingredients in the appropriate proportions until the reaction mixture thickens to the desired viscosity and then blowing carbon dioxide through it. In most instances, a period of at least 1 hour of mixing is desirable. The volatile components may be removed from the product by evapoartion or distillation. The temperature at which the process is carried out is preferably the reflux temperature or a temperature slightly below the reflux temperature of the solution. It may be as low as 25° C. and seldom exceeds 180° C.

As mentioned above, one of the features of the process of this invention is the ability to prepare a homogeneous thickened composition of a carbonated, basic alkali or alkaline earth metal salt in a dilute solution. Heretofore, such thickened compositions could only be prepared in concentrated mineral oil solutions. Such concentrated solutions result in the formation of greases which are extremely viscous and difficult to homogenize or mix. Expensive heavy-duty stirring and homogenizing equipment is required.

The principal novel feature of this invention, however, is the carbonation of the thickened basic metal salt. This step so modifies the process as to result in a product which has been found to be noticably superior to those prepared by other known methods. It has improved rheological properties, as indicated by its unexpectedly high yield value, and its use in the formulation of plastic compositions improves the stability of those compositions. Examples of volatile, fluidizing liquids in which this process can be carried out include the hydrocarbon solvents, halogenated hydrocarbon solvents, lower petroleum fractions, ethers, esters, etc. Examples of petroleum fractions which have been found to be useful include naphtha, kerosene and fuel oil. Of the hydrocarbon solvents, the aromatic hydrocarbons having from six to thirty carbon atoms are particularly useful and these include benzene, toluene, xylene, ethylbenzene and diethylbenzene. Alipathic and cycloaliphatic hydrocarbons having from five to fifteen carbon atoms are useful, and these include cyclohexane, heptane, octane and decane. Halo and polyhalo-hydrocarbons having from two to twenty carbon atoms are also useful. These include 1,1,1-trichloroethane, 1,1-dichlorobutane, 1,4-dichlorobutane, 1-chlorohexane, and chlorocyclohexane. Examples of other solvents include di-n-decyl phthalate, di-n-octyl phthalate, diphenyl propyl ether and phenyl methyl ether.

The carbonated, basic alkali or Group II metal salts useful in the above process include the salts of lithium, sodium, potassium, magnesium, calcium, strontium, barium, and cadmium with a long chain sulfonic acid or carboxylic acid. The acid should contain at least about 12 aliphatic carbon atoms in the molecule. The sulfonic acids include the aliphatic and the aromatic sulfonic acids. They are illustrated by petroleum sulfonic acids or the acids obtained by treating an alkylated aromatic hydrocarbon with a sulfonating agent, e.g., chlorosulfonic acid, sulfur trioxide, oleum, sulfuric acid, or sulfur dioxide and chlorine. The sulfonic acids obtained by sulfonating the alkylated benzene, naphthylene, phenol, phenol sulfide, or diphenyl oxide are especially useful.

Specific examples of the sulfonic acids are mahogany acid, nono-wax (eicosane)-substituted naphthylene sulfonic acid, dodecylbenzene sulfonic acid, didodecylbenzene sulfonic acid, dinonylbenzene sulfonic acid, octadecyl-diphenyl ether sulfonic acid, octadecyl-diphenyl amine sulfonic acid, cetyl-chlorobenzene sulfonic acid, bis-cetylphenyl disulfide sulfonic acid, cetoxy-caprylbenzene sulfonic acid, dilauryl beta-naphthalene sulfonic acid, the sulfonic acid derived by the treatment of polyisobutene having a molecular weight of 1500 with chloro sulfonic acid, nitronaphthylene sulfonic acid, paraffin wax sulfonic acid, cetylcyclopentane sulfonic acid, lauryl-cyclohexane sulfonic acid, and polyethylene (molecular weight of 750) sulfonic acid, etc. The carboxylic acids likewise may be aliphatic or aromatic acids. They are exemplified by palmitic acid, stearic acid, myristic acid, oleic acid, linoleic acid, behenic acid, hexatriacontanoic acid, tetrapropylene-substituted glutaric acid, polyisobutene (molecular weight of 5000)-substituted succinic acid, polypropylene (molecular weight of 10,000)-substituted succinic acid, octadecyl-substituted adipic acid, chlorostearic acid, 9-methylstearic acid, dichlorostearic acid, stearylbenzoic acid, polywax (eicosane)-substituted naphthoic acid, dilauryldecahydronaphthylene carboxylic acid, didodecyltetralin carboxylic acid, dioctyl-cyclohexane carboxylic acid, and the anhydrides of such acids.

An important class of carbonated, basic alkaline earth metal salts of the above-illustrated acids, as regards the preparation of non-Newtonian colloidal disperse systems which are gels, is that they have a metal ratio of at least about 4.5. The desirability of this high metal ratio is predicated upon the discovery that the use of a salt having a metal ratio less than 4.5 in the above process will not result in a product having the thickness of a gel. On the other hand, the use of salts having a metal ratio between about 8 and 20 has been found to be most advantageous, although salts having still higher metal ratios such as up to 100 likewise are effective.

A convenient process for preparing the metal salts used in this process comprises carbonating a substantially anhydrous mixture of an acid (as above) with at least a stoichometric excess of an alkali or Group II metal base in the presence of a promoting agent. The metal base may be an alkali or Group II metal oxide, hydroxide, bicarbonate, sulfide, mercaptide, hydride, alcoholate, or phenate. It is preferably an oxide, alcoholate, or hydroxide or barium or calcium. The carbonation is carried out in a solvent which is preferably minerol oil, although it may be n-hexane, naphtha, n-decane, dodecane, benzene, toluene, xylene, or any other fluid hydrocarbon.

The promoting agent is preferably an alcohol or a phenol; it may be a mercaptan, amine, acid-nitro compound, a metal phenate, or an enolic compound. The alcohols and phenols useful as the promoting agent include, for example, methanol, ethanol, isopropanol, cyclohexanol, decanol, dodecanol, behenyl alcohol, ethylene glycol, diethylene glycol, triethylene glycol, monomethyl ether of ethylene glycol, trimethylene glycol, hexamethylene glycol, glycerol, pentaerythritol, benzyl alcohol, phenylethyl alcohol, phenol, naphthol, cresol, catechol, p-tert-butylphenol, m-polyisobutene (molecular weight of 350)-substituted phenol, o,p-didodecylphenol, alpha-hexyl-beta-naphthol, m-cyclohexylphenol, 4,4'-methylene-bisphenol and 2,2'-methylene-4,4'-dioctyl besphenol. Other compounds useful as the promoting agent are illustrated by acetoacetate, acetylacetone, acetamide, ethanolamine, diethanolamine, triethanolamine, nitro-methane, nitro-propane, nitro-decane, nitro-benzene, nitro-toluene, methylamine, dimethylamine, aniline, phenylenediamine, N,N'-dimethyl phenylenediamine, toluidine, cyclohexylamine, N-methyl decylamine, naphthylamine, o-chlorophenol, m-nitro-phenol, o-methoxy-phenol, thiophenol, methyl mercaptan, dodecyl mercaptan, isooctyl mercaptan and benzyl mercaptan.

It will be noted that upon mixing with the metal base, the sulfonic or carboxylic acid forms a metal salt so that the process mixture before carbonation contains a metal salt of the acid and the excess metal base. Such a mixture is heterogeneous primarily because of the presence of the excess of the insoluble metal base. As carbonation proceeds, the metal base becomes solubilized in the organic phase and the carbonated product eventually becomes a homogeneous composition containing the excess amount of the metal. The mechanism of the formation of the homogeneous product is not fully understood. It is believed, however, that carbonation converts the excess metal base to a carbonate or bicarbonate which forms with the metal salt of the oil-soluble acid a homogeneous complex. The complex is readily soluble in hydrocarbon solvents such as benzene, xylene, and mineral oil. However, it is not necessary for all of the metal base present in the process mixture to be so converted by carbonation to produce a soluble, homogeneous product. In many instances a homogeneous product is obtained when as little as 75% of the excess metal base is carbonated. For the sake of convenient reference in the specification and the claims of this invention, the term "carbonated, basic alkali or Group II metal salt" of the acid designates the homogeneous, carbonated product without specific reference to the degree of conversion of the excess metal base by carbonation.

The formation of carbonated, basic metal salts having high metal ratios requires the presence in the carbonation step of a promoting agent such as described previously. The amount of the promoting agent to be used is best defined in terms of its chemical equivalents per equivalent of the long chain sulfonic or carboxylic acid used. The amount may be as little as 0.1 equivalent or as much as 10 equivalents or even more per equivalent of the acid. The preferred amount is within the range from 0.25 to 5 equivalents per equivalent of the acid. It will be noted that the equivalent weight of the promoting agent is based upon the number of functional radicals in the molecule. To illustrate, the equivalent weight of an alcohol is based upon the number of the alcoholic radicals in the molecule; that of a phenol is based upon the number of the hydroxyl radicals in the molecule; that of an amine is based upon the number of the amino radicals in the molecule; etc. Thus, methanol has one equivalent per mole; ethylene glycol has two equivalents per mole; a bis-phenol has two equivalents per mole; phenylenediamine has two equivalents per mole; nitro-propane has one equivalent per mole; acetylacetone has one equivalent per mole; etc.

The carbonation temperature depends to a large measure upon the promoting agent used. When a phenol is used as the promoting agent the temperature usually ranges from about 80° C. to 300° C. and preferably from 100° C. to 200° C. When an alcohol or a mercaptan is used as the promoting agent the carbonation temperature usually will not exceed the reflux temperature of the reaction mixture and preferably will not exceed 100° C.

After carbonation, the promoting agent, if it is a volatile substance, may be removed from the product by distillation. If the promoting agent is a non-volatile substance it is usually allowed to remain in the product.

The following examples illustrate the process of preparing the carbonated, basic metal salts useful as component (B) in the process of this invention.

Example 1

To a mixture of 400 parts (by weight) of a 30% mineral oil solution of barium petroleum sulfonate (sulfate ash of 7.6%), 32.5 parts of octyl phenol and 197 parts of water there is added 73 parts of barium oxide throughout a period of 30 minutes at 57°–84° C. The mixture is heated at 100° C. for 1 hour to remove substantially all water and blown with 75 parts of carbon dioxide at 133°–170° C. throughout a period of 3 hours. A mixture of 1000 grams of the above carbonated intermediate product, 121.8 parts of octyl phenol and 234 parts of barium hydroxide is heated at 100° C. and then at 150° C. for one hour. The mixture is then blown with carbon dioxide at 150° C. for one hour at a rate of 3 cu. ft. per hour. The carbonated product is filtered and the filtrate is found to have a sulfate ash content of 39.8 and a metal ratio of 9.3.

Example 2

To a mixture of 3245 parts (12.5 equivalents) of barium petroleum sulfonate, 1460 parts (7.5 equivalents) of heptyl phenol, and 2100 parts of water in 8045 parts of mineral oil there is added at 180° F., 7400 parts (96.5 equivalents) of barium oxide. The addition of barium oxide causes the temperature to rise to 290° F. which temperature is maintained until all of the water has been distilled. The mixture then is blown with carbon dioxide until it is substantially neutral. The product is diluted with 5695 parts of mineral oil and filtered. The filtrate is found to have a barium sulfate ash content of 30.5% and a metal ratio of 8.1.

Example 3

A mixture of 1285 parts (1.0 equivalent) of 40 percent barium petroleum sulfonate and 500 ml. (12.5 equivalents) of methanol is stirred at 55°–60° C. while 301 parts (3.9 equivalents) of barium oxide is added portionwise over a period of one hour. The mixture is stirred an additional two hours at 45°–55° C., then treated with carbon dioxide at 55°–65° C. for two hours. The resulting mixture is freed of methanol by heating to 150° C. The residue is filtered through a siliceous filter aid, and the resulting clear, brown filtrate found to have the following analyses: sulfate ash, 33.2%; neut. No., slightly acid; metal ratio, 4.7.

Example 4

A solution of 1928 parts (1.5 equivalents) of 40 percent barium petroleum sulfonate in 1004 parts of oil and 188 ml. (4.7 equivalents) of methanol is prepared and heated to 40° C. Carbon dioxide is bubbled into this solution and 796 parts (10.4 equivalents) of barium oxide is added portionwise over a period of two hours. The temperature is maintained between 40° C. and 70° C. throughout and when all the barium oxide has been added the carbon dioxide-treatment is continued for an additional four hours. The resulting mixture is then heated to 150° C. and held at this temperature for 30 minutes to remove any volatile material. The residue is filtered, yielding a clear, brown filtrate having the following analyses: sulfate ash, 32.5%; neut. No., 1.2 (basic); metal ratio, 7.2.

Example 5

A stirred mixture of 57 parts (0.4 equivalent) of nonyl alcohol and 301 parts (3.9 equivalents) of barium oxide is heated at 150°–175° C. for an hour, then cooled to 80° C. whereupon 400 parts (12.5 equivalents) of methanol is added. The resultant mixture is stirred at 70°–75° C. for 30 minutes, then treated with 1285 parts (1.0 equivalent) of 40 percent barium petroleum sulfonate. This mixture is stirred at reflux temperature for an hour, then treated with carbon dioxide at 60°–70° C. for two hours. The mixture then is heated to 160° C./18 mm. and filtered. The filtrate is a clear, brown oil having the following analyses: sulfate ash, 32.5%; neut. No., nil; metal ratio, 4.7.

Example 6

A mixture of 574 parts (0.5 equivalent) of 40 percent barium petroleum sulfonate, 98 parts (1.0 equivalent) of furfuryl alcohol and 762 parts of mineral oil is heated with stirring at 100° C. for an hour, then treated portionwise over a 15-minute period with 230 parts (3.0 equivalents) of barium oxide. During this latter period the temperature rises to 120° C. (because of the exothermic nature of the reaction of barium oxide and the alcohol); the mixture then is heated at 150°–160° C. for an hour, and treated subsequently at this temperature for 1.5 hours with carbon dioxide. The material is concentrated by heating to a final temperature of 150° C./10 mm., then filtered to yield a clear, oil-soluble filtrate having the following analyses: sulfate ash, 21.4%; neut. No., 2.6 (basic); metal ratio, 6.1.

Example 7

To a mixture of 1145 parts (one equivalent) of a 40% mineral oil solution of barium mahogany sulfonate and 100 parts of methyl alcohol at 55° C. there is added 220 parts of barium oxide while the mixture is being blown with carbon dioxide at a rate of 2–3 cubic feet per hour. To this mixture there is added an additional 78 parts of methyl alcohol and then 460 parts of barium oxide while the mixture is being blown with carbon dioxide. The carbonated product is heated to 150° C. for one hour and filtered. The filtrate is found to have a barium sulfate ash content of 53.8 percent and a metal ratio of 8.9.

Example 8

A carbonated basic metal salt is prepared in accordance with the procedure of Example 7 except that a total of 16 equivalents of barium oxide is used per equivalent of the barium mahogany sulfonate used. The product is found to have a metal ratio of 13.4.

Example 9

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to distill off methyl alcohol and water and the resulting oil solution of the basic calcium sulfonate filtered. The filtrate is found to have a calcium sulfate ash content of 16% and a metal ratio of 2.5. A mixture of 1305 grams of the above carbonated calcium sulfonate, 930 grams of mineral oil, 220 grams of methyl alcohol, 72 grams of isobutyl alcohol, and 38 grams of amyl alcohol is prepared, heated to 35° C., and subjected to the following operating cycle 4 times: mixing with 143 grams of 90% calcium hydroxide and treating the mixture with carbon dioxide until it has a base number of 32–39. The resulting product is then heated to 155° C. during a period of 9 hours to remove the alcohols and then filtered through a siliceous filter-aid at this temperature. The filtrate has a calcium sulfate ash content of 39.5%, and a metal ratio of 12.2.

Example 10

A basic metal salt is prepared by the procedure described in Example 9 except that the slightly basic calcium sulfonate having a metal ratio of 2.5 is replaced with a mixture of that same calcium sulfonate (280 parts by weight) and tall oil acids (970 parts by weight, having an equivalent weight of 340), and the total amount of calcium hydroxide used is 930 parts by weight. The resulting highly basic metal salt of the process has a calcium sulfate ash content of 48%, a metal ratio of 7.7, and an oil content of 31%.

Example 11

A highly basic metal salt is prepared by the procedure of Example 10 except that the slightly basic calcium sulfonate starting material having a metal ratio of 2.5 is replaced with tall oil acids (1250 parts by weight, having an equivalent weight of 340) and the total amount of calcium hydroxide used is 772 parts by weight. The resulting highly basic metal salt has a metal ratio of 5.2, a calcium sulfate ash content of 41%, and an oil content of 33%.

Example 12

A highly basic metal salt is prepared by the procedure of Example 10 except that the slightly basic calcium sulfonate starting material is replaced with a mixture of that same basic calcium sulfonate (555 parts by weight) and tall oil acids (694 parts by weight having an equivalent weight of 340) and the amount of calcium hydroxide used is 772 parts by weight. The resulting metal salt has a metal ratio of 7.9, a calcium sulfate ash content of 45%, and an oil content of 32%.

Example 13

A basic metal salt is prepared by the process of Example 9 except that the amount of the slightly basic calcium sulfonate used is 1672 parts and the amount of the calcium hydroxide used is 704 parts. The resulting highly basic metal salt has a metal ratio of 12.2 and a calcium sulfate ash content of 40%.

Example 14

A highly basic metal salt is prepared by the procedure of Example 13 except that the slightly basic calcium sulfonate starting material has a metal ratio of 1.6 and the amount of this calcium sulfonate used is 1050 parts (by weight), and the total amount of lime used is 630 parts. The resulting metal salt has a calcium sulfate ash content of 40%, a metal ratio of 16 and an oil content of 35%.

Example 15

To a mixture of 1614 parts (3 equivalents) of a polyisobutenyl succinic anhydride (prepared by the reaction of a chlorinated polyisobutene, having an average chlorine content of 4.3% and an average of 67 carbon atoms, with maleic anhydride at about 200° C.), 4313 parts of mineral oil, 345 parts (1.8 equivalent) of heptylphenol, and 200 parts of water, at 80° C., there is added 1038 parts (24.7 equivalent) of lithium hydroxide monohydrate over a period of 0.75 hour while heating to 105° C. Isooctanol (75 parts) is added while the mixture is heated to 150° C. in about 1.5 hours. The mixture is maintained at 150°–170° C. and blown with carbon dioxide at the rate of 4 cubic feet per hour for 3.5 hours. The reaction mixture is filtered through a filter aid and the filtrate is the desired product having a sulfate ash content of 18.9 and a metal ratio of 8.0.

Example 16

To a mixture of 3800 parts (4 equivalents) of a 50% mineral oil solution of lithium petroleum sulfonate (sulfate ash of 6.27%), 460 parts (2.4 equivalents) of heptylphenol, 1920 parts of mineral oil, and 300 parts of water there is added at 70° C., 1216 parts (28.9 equivalents) of lithium hydroxide monohydrate over a period of 0.25 hour. The mixture is stirred at 110° C. for 1 hour, heated to 150° C. in 2.5 hours, and blown with carbon dioxide at the rate of 4 cubic feet per hour over a period of about 3.5 hours until the reaction mixture is substantially neutral. The mixture is filtered and the filtrate is the desired product having a sulfate ash content of 25.23% and a metal ratio of 7.2.

Example 17

A mixture of 244 parts (0.87 equivalent) of oleic acid, 180 parts of primary-isooctanol, and 400 parts of mineral oil is heated to 70° C. whereupon 172.6 parts (2.7 equivalent) of cadmium oxide is added. The mixture is heated for 3 hours at a temperature of 150°–160° C. while removing water. Barium hydroxide monohydrate (324 parts, 3.39 equivalents) is then added to the mixture over a period of one hour while continuing to remove water by means of a side-arm water trap. Carbon dioxide is blown through the mixture at a temperature of from 150°–160° C. until the mixture is slightly acidic to phenolphthalein. Upon completion of the carbonation, the mixture is stripped to a temperature of 150° C. at 35 mm. to remove substantially all the water and alcohol present. The residue is the desired product.

Example 18

A carbonated calcium sulfonate complex having a metal ratio of 2.5 is prepared by reacting a normal calcium mahogony sulfonate (750 parts) with 54 parts of lime at a temperature of 150° C. for 5 hours. The mixture is then cooled to 40° C. whereupon 98 parts of methanol is added and 152 parts of carbon dioxide is introduced over a period of 20 hours at 42°–43° C. The mixture is then heated to 150° C. to remove water and alcohol. The residue is diluted with 100 parts of mineral oil and filtered.

A mixture of 1595 parts (1.54 equivalents) of the carbonated calcium sulfonate complex prepared above, 616 parts of mineral oil, 167 parts (0.19 equivalent) of a calcium phenate (prepared by reacting 960 parts of heptylphenol, 50 parts of water, 207 parts of calcium hydroxide and 231 parts (7 moles) of 91% formaldehyde), 157 parts of 91% calcium hydroxide (3.86 equivalents), 288 parts of methanol, 88 parts of isobutanol, and 56 parts of mixed isomeric primary amyl alcohols (containing about 65% n-amyl, 3% isoamyl and 32% of 2-methyl-1-butyl alcohols) is stirred vigorously at 40° C. Carbon dioxide (25 parts) is bubbled through the mixture over a period of 2 hours at this temperature. Thereafter, 3 additional portions of calcium hydroxide, each amounting to 157 parts, are added and each such addition is followed by the addition of carbon dioxide as previously illustrated. After the fourth calcium hydroxide addition and carbonation step are completed, the reaction mass is carbonated for an additional hour at 43°–47° C. to reduce the neutralization number of the mixture to 4.0 (basic). The substantially neutral, carbonated reaction mixture is then freed from alcohol and any water of reaction by heating to 150° C. and simultaneously blowing with nitrogen. The residue filtered and the filtrate is the desired product having a sulfate ash content of 41.11% and a metal ratio of 12.55.

Example 19

The procedure of Example 9 is repeated except that an equivalent amount of sodium hydroxide is used in lieu of the calcium oxide.

Example 20

The procedure of Example 6 is repeated except that the barium sulfonate is replaced by an equivalent amount of potassium sulfonate, and potassium oxide is used in lieu of the barium oxide.

Example 21

A carbonated, basic sodium salt is prepared by the process of Example 7 by replacing the barium sulfonate with an equivalent amount of sodium sulfonate, and replacing the barium oxide with sodium hydroxide.

Example 22

The procedure of Example 7 is repeated except that the mineral oil solution of the barium mahogony sulfonate is replaced by a xylene solution of the barium sulfonate.

The use of a mixture of water and one or more of the alcohols is especially effective in promoting the thickening of the solution. Such combinations often reduce the length of time required for the process. A very effective combination is a mixture of water and an alcohol (or alcohols) in a weight ratio (of water:alcohol) within the range of from 1:0.5 to about 1:5.

Phenols may also be used in the process of this invention. In addition to phenol itself, naphthol, ortho-cresol, para-cresol, catechol, mixtures of cresols, p-tert-butylphenol, and metapolyisobutene (molecular weight of 350)-substituted phenol are also effective in the process.

Other compositions which are useful in this respect include aldehydes and ketones such as acetone, methyl ethyl ketone, acetaldehyde, and propionaldehyde; amines and polyamines such as dodecyl amine, cyclohexyl amine, aniline, piperazine, 2-octadecyl imidazoline, oxazolidine, ethanolamine, diethanolamine, o-phenylene diamine, ethylene diamine, triethylene tetramine, propylene diamine, and octamethylene diamine; boron acids such as boronic acid (e.g., alkyl-$B(OH)_2$ or aryl-$B(OH)_2$), boric acid (i.e., $H_3BO_3$), tetraboric acid, metaboric acid and esters of such boron acids; phosphorus acids such as the various alkyl and aryl phosphinic acids, phosphinous acids, phosphonic acids and phosphonous acids. Those phosphorus acids obtained by the reaction of the lower alcohols (those having less than about 8 carbon atoms) or hydrocarbons containing unsaturated linkages (e.g., polyisobutenes) with phosphorus oxides and phosphorus sulfides are particularly useful.

Also useful for this purpose are oxygen (e.g., air), carbon dioxide or mixtures of oxygen and carbon dioxide with any of the other compositions which are useful in themselves.

The carboxylic acids contemplated for this purpose are the lower alpihatic carboxylic acids, i.e., those containing less than about 8 carbon atoms in the molecule. They include, for example, formic acid, acetic acid, propionic acid, butyric acid, valeric acid, isovaleric acid, isobutyric acid, caproic acid, heptoic acid, caprylic acid, chloroacetic acid, dichloroacetic acid and trichloroacetic acid. Of these, formic acid, acetic acid and propionic acid are preferred. The anhydrides of these acids likewise are useful, and for the puropses of the specification and claims of this invention, the term "acid" includes both the acid and the anhydride of the acid.

The alcohols which are useful in the process of this invention include aliphatic, cycloaliphatic, and aromatically substituted aliphatic alcohols. Those having less than about 12 carbon atoms are especially useful and the lower alcohols, i.e., those having less than about 8 carbon atoms, are preferred for reasons of economy and effectiveness in the process. They are illustrated by methanol, ethanol, isopropanol, n-propanol, isobutanol, secondary butanol, cyclopentanol, cyclohexanol, 4-methylcyclohexanol, isooctanol, dodecanol, benzyl alcohol, cinnamyl alcohol, 2-cyclopentyl-propanol, chloro-hexanol, bromo-octanol, monomethyl ether of ethylene glycol, diethylene glycol, ethylene glycol, trimethylene glycol, hexamethylene glycol, triethylene glycol, 1,4-butane diol, 1,4-cyclohexane diol, glycerol, and pentaerythritol.

As indicated previously, the process of this invention for the preparation of non-Newtonian colloidal disperse systems comprises treating a solution of certain carbonated, basic metal salts with a composition which effects a thickening process. The metal salts thus contemplated are generally prepared in the presence of a solvent such as mineral oil, xylene or toluene. The mineral oil or other solvent maintains the metal salt in the fluid state. An important aspect in the formation of the homogeneous thickened composition by the process of this invention is that the metal salt be free from any insoluble contaminants. Thus, if any such contaminants are present in the solution of the metal salt as a result of, e.g., insufficient carbonation of the metal base used in preparing the carbonated basic metal salts, the solution of this metal salt must be filtered or centrifuged before it is used in the process of this invention. The necessity of removing the insoluble contaminants is based upon the discovery that unless they are so removed, a thickened composition can not be obtained or, if obtained, it will not have the desired degree of homogeneity or other desirable characteristics.

The concentration of the carbonated, basic salt in the fluid solution should be at least about 10% by weight and may be as high as 70%. The concentration of the treating agent in the process is usually within the range of from about 1% to about 80% based upon the weight of the carbonated, basic metal salt. The concentration is preferably at least about 10% and usually less than 60% by weight of the metal salt.

Thus, the non-Newtonian compositions of this invention can be obtained from a solution containing about 100 parts by weight of solvent (including a volatile, fluidizing liquid and mineral oil), from about 10 to 70 parts by weight of a carbonated, basic metal salt, and from about 0.01 to about 0.80 part by weight, per part of basic metal salt, of the treating agent.

The carbonation of the non-Newtonian composition generally is carried out immediately after its formation at the same temperature. That is, if a carbonated basic metal sulfonate has been converted to a non-Newtonian colloidal disperse system by heating with a lower alcohol, then that product may be carbonated immediately at the same temperature. The carbonation preferably is continued until the product is about neutral to phenolphthalein, as measured by ASTM Test D664–58, modified by the use of a titration solvent consisting of 80% of that specified in this test procedure and 20% of water.

The process of the invention may be modified, and preferably is so modified by incorporating a second carbonation step in an earlier stage of the process. The partially carbonated basic metal salt may be carbonated as such, or after it has been mixed with the volatile, fluidizing liquid. Such carbonation is continued preferably until the mixture is neutral to phenolphthalein, but as measured by the above ASTM Test D664–58 (not modified). A neutral end point using the solvent mixture of the modified test corresponds to a neutralization number of about 15 as determined using the solvent of ASTM Test D664–58. This additional earlier carbonation step shortens the time required to convert the carbonated basic metal salt to a non-Newtonian composition. Also, it accomplishes a substantial proportion of the desired, ultimate neutralization under easier conditions, in a less viscous medium.

The present invention also includes processes involving the thickening of mixtures of carbonated, basic alkaline earth metal salts of sulfonic acids and carboxylic acids according to the above procedures.

The non-Newtonian compositions of this invention are obtained by mixing the components and then heating the mixture, generally to reflux temperature. The temperature of the reaction mixture and the length of time the reaction mixture is maintained at this temperature determines the rate of thickening and the viscosity of the resulting gel. Generally when the reaction mixture is heated to reflux temperature a reaction time of from about 5 to 10 hours is sufficient to give a product having the desired properties. The products may be used as obtained in this procedure, i.e., containing varying amounts of the volatile fluidizing liquid, where such materials are beneficial to the end use, or they may be removed by heating the product mixture to a temperature of about 150°–200° C. or higher, whereupon other solvents such as mineral oil and resins may be blended therewith to produce greases or other thickened compositions.

Ordinarily, it is desirable to remove the volatile, fluidizing liquid, plus any other volatile materials such as the treating agent, from the product mixture. They may be removed by evaporation and, while flash stripping is a suitable method for such purpose, it is preferred to use kettle stripping, i.e., to heat the entire product mixture and distill the volatile materials. It is important for some contemplated uses of the product that the product mixture not be heated more than is necessary to remove the volatile materials, and if water is present, as it is in the case of most metal sulfonates, this heating and evaporation step should be carried so as to yield a product having a water content of at least about 0.1%.

The products of this process are notably superior to those resulting from prior art processes in which there is no carbonation of the non-Newtonian colloidal disperse system. One item of superiority is the relative ease of handling of the product; it is a smooth, buttery material whereas the prior art products tended to be stringy, rubbery and intractable. Another item of superiority is the improved compatibility of the product with the ordinary components of plastic formulations. The use of prior art materials in formulating plastic compositions frequently resulted in odor problems. The products herein do not give rise to any such problem. Still another item of superiority has to do with the viscosity of the product. The product of the process of this invention is characterized by a significantly greater yield value than those of prior art products. This property permits the use of a lesser amount of the product in formulating plastic compositions intended for use as paints.

The following examples illustrate the process of this invention for the preparation of the non-Newtonian compositions. The penetration values (unmilled) reported herein are obtained by the ASTM D–217 procedure at 77° F. All neutralization numbers are determined by the method of ASTM Test D664–58 unless otherwise indicated.

Example A

A mixture of 340 parts of the carbonated, basic calcium salt of Example 9, 68 parts of an alcohol:water mixture consisting of 27.2 parts of methanol, 20.4 parts of isopropyl alcohol and 20.4 parts of water, and 170 parts of toluene is heated with agitation to 71° C. in 1 hour. This solution has a Brookfield viscosity of 1400. The mixture is then maintained at a temperature of from 71°–74° C. for 8.2 hours, then blown with carbon dioxide at the rate of 5 lbs./hr. for 1 hour at 66–68° C. The volatile constituents are removed by evaporation by heating at 140–155° C. with nitrogen blowing for 5.8 hours. The residue is the desired non-Newtonian composition.

Example B

A mixture of 340 parts of the product of Example 9, 68 parts of the alcohol:water mixture described in Example A and 170 parts of heptane is heated with agitation to 65° C. During this period, the viscosity of the mixture increases from an initial value of 6250 to 54,000.

The above thickened solution is further neutralized by blowing with carbon dioxide at the rate of 5 pounds per hour for 1 hour. The resulting solution is found to have a neutralization number of 0.87 (acid) as determined by the modified ASTM Test D664–58 procedure.

Example C

The procedure of Example A is repeated except that the calcium salt of Example 9 is replaced by an equivalent amount of the cadmium and barium salt of Example 17. Xylene (200 parts) is used in lieu of the toluene.

Example D

A mixture of 500 parts of the product of Example 9 and 200 parts of cyclohexane is blown with carbon dioxide at the rate of 3 lbs./hr. throughout a period of 3.5 hours at 46–48° C. The mixture is found to have a neutralization number of 0.29 (acid). To this material is added 100 parts of the alcohol:water mixture described in Example A and the resulting mixture is heated with agitation at 65° C. for 4 hours, the Brookfield viscosity of the mixture is found to be 11,575. An additional 50 parts of cyclohexane is incorporated into the mixture and then carbon dioxide is blown through it at the rate of 5 lbs./hr. for 3 hours at 135° F. The carbonated material is found to be slightly acid to phenolphthalein, as determined by the modified ASTM Test D664–58 procedure.

Example E

A mixture of 525 parts of the product of Example 9 and 210 parts of heptane is blown with carbon dioxide at the rate of 20 lbs./hr. for 2 hours at 56–60° C. The neutralization number of the carbonated material is 0.7 (acidic). A mixture of 21.7 parts of methyl alcohol, 6.5 parts of isopropyl alcohol and 21.7 parts of water is added and the resulting mixture is heated with agitation at reflux temperature for 1.5 hours, then carbonated at the rate of 10 lbs./hr. for 10.5 hours while removing volatile materials by flash evaporation. Nitrogen is blown through the mixture for 5.5 hours at 149–155° C. The residue has a milled penetration value at 77° F. of 273 and a yield value of 2200.

Example F

A mixture of 490 parts of the product of Example 9 and 196 parts of heptane is blown with carbon dioxide at the rate of 20 lbs./hr. for 2 hours at 52–59° C. The neutralization number of the carbonated product is 0.35 (acidic). 49 parts of the water-alcohol mixture of Example E is added and the resulting mixture is agitated at reflux temperature for 2.25 hours to produce a material having a Brookfield viscosity value of 4,550. This material is carbonated while removing volatile material by flash evaporation. The slightly acidic residue is heated with nitrogen blowing at 268–288° C. for 13 hours. The residue has a yield value of 1750.

Example G

A mixture of 460 parts of the product of Example 9 and 107.5 parts of heptane is blown with carbon dioxide at the rate of 20 lbs./hr. for 2 hours at 54° C. To the slightly acidic carbonated product there is added 49 parts of the water-alcohol mixture described in Example E and the resulting mixture is agitated at 66° C. for 2.5 hours, then blown with carbon dioxide at the rate of 20 lbs./hr. for 4.8 hours at 66° C. to yield a product having a neutralization number of 2.0 (acidic) as determined by the modified ASTM Test D666–58. This product is freed of volatile constituents by heating with nitrogen blowing until the water content was 0.1%. The residue is found to have a yield value of 2150 and a milled penetration value at 77° F. of 277.

Non-Newtonian colloidal disperse systems prepared by the process of this invention are characterized by homogeneity and stability to air, heat, and moisture. They also are characterized by non-corrosiveness, detergency, and load-carrying properties. They may vary in consistency and hardness throughout a range of penetration values of from 50 to 400 (according to the ASTM D–217 procedure at 77° F.). Another desirable characteristic of these compositions is a relatively high dropping point (i.e., the temperature at which the composition liquifies) which permits their use under high temperature service conditions. In most instances, they have dropping points above about 400° F.

The thickened compositions of this invention are useful as additives in hydrocarbon oil compositions to improve their viscosity index values. When used for this purpose they are usually present in a hydrocarbon oil at concentrations within the range of from about 1% to about 30% by weight.

As mentioned previously the volatile, fluidizing liquid used in the preparation of the disperse systems of this invention need not be removed at the end of the process but may be left in the product mixture when desirable for certain applications. For example, where the product is to be applied to a metal surface as a corrosion-inhibiting film, the fluidizing liquid facilitates application of the product to the metal surface. For some applications, the viscosity of the product may be further adjusted by adding suitable amounts of volatile solvents such as those used in the formation of the product.

The fluidizing liquid is also left in the product when it is to be combined with other compositions for particular applications. For example, where it is desirable to combine it with hydrocarbon resins such as polystyrene resins, coumarone-indene resins, and polymerized beta-pinenes, the presence of the fluidizing liquid is desirable. After application to the surfaces to be treated, the fluidizing liquid is easily removed by evaporation.

The disperse systems produced by the process of this invention are useful for the manufacture of high film strength lubricating greases. Such greases are prepared by blending from about 20 to about 90 parts of the disperse system with from about 8 to about 10 parts by weight from an oil, preferably a mineral oil, although naturally-occurring vegetable or animal oils as well as synthetic oil such as dioctyl adipate, dinonyl sebacate, polymerized isobutenes, dioctyl phthalate, etc., may be used. The oil should have a Saybolt viscosity in the range of from about 100 seconds at 100° F. to about 250 seconds at 210° F. The blending of the gel and the oil may be accomplished conveniently by known methods such as stirring in a propeller-type or egg beater type or mixer and/or milling them in a conventional grease milling machine.

The thickened compositions obtained by the process of this invention are also useful as additives in asphalt emulsions, insecticidal compositions, yield-builders in plastisols and organosols, stabilizing agents or plasticizers in plastics, paints, slushing oils, pesticides, foaming compositions, cutting oils, metal drawing compositions, textile treatment compositions, metal cleaning compositions, emulsifying agents, penetrating oils, hydraulic oils, bonding agents for ceramics and asbestos, asphalt improving agents and flotation agents.

What is claimed is:
1. In the process for converting a partially carbonated basic alkali or Group II metal salt of a sulfonic or carboxylic acid having at least 12 aliphatic carbon atoms into a non-Newtonian colloidal disperse system comprising agitating a mixture of said metal salt and from about 1% to about 80% by weight, based on said metal salt, of a lower aliphatic carboxylic acid, water, alcohol, phenol, ketone, aldehyde, amine, boron acid, phosphorus acid or oxygen, the improvement comprising agitating said mixture in the presence of a volatile, fluidizing liquid for said disperse system, and carbonating the resulting mixture until the basicity thereof is reduced.

2. The process of claim 1 wherein the carbonated basic metal salt is a carbonated basic alkaline earth metal salt of a sulfonic acid.

3. In the process for converting an oil solution of a partially carbonated basic Group II metal salt of an oil-soluble sulfonic acid into a non-Newtonian colloidal disperse system, the improvement comprising agitating a mixture of said solution with from about 1% to about 80%, by weight, based on said metal salt, of an alcohol-water mixture in the presence of a volatile, fluidizing liquid for said disperse system, and carbonating the resulting mixture until the basicity thereof is reduced.

4. The process of claim 3 wherein the mixture is carbonated to substantial neutrality.

5. The process of claim 3 wherein the volatile constituents of the carbonated mixture are removed by vaporation.

6. The process of claim 3 wherein the partially carbonated basic Group II metal salt of an oil soluble sulfonic acid is further carbonated to a constant neutralization number.

7. The process of claim 3 wherein the volatile constituents of the carbonated mixture are removed by kettle evaporation.

8. The process of claim 3 wherein a sufficient quantity of the volatile constituents of the carbonated mixture are removed by evaporation so as to leave at least 0.1% by weight of water in the non-Newtonian colloidal disperse system.

9. The process of claim 3 wherein the Group II metal salt is a calcium salt.

10. The process of claim 3 wherein the oil-soluble sulfonic acid is a petroleum sulfonic acid.

11. The process of claim 3 wherein the alcohol-water mixture is a mixture of water and one or more lower alcohols.

12. The process of claim 3 wherein the alcohol-water mixture is a mixture of water, methanol and isopropyl alcohol.

13. In the process for converting an oil solution of a partially carbonated basic calcium salt of a petroleum sulfonic acid into a non-Newtonian colloidal disperse system, the improvement comprising agitating a mixture of said solution and from about 1% to about 80%, by weight based on said metal salt, of a water-lower alcohol mixture having a weight ratio of from about 1:0.5 to about 1:5, in the presence of a volatile, fluidizing liquid for said disperse system, and carbonating the resulting mixture until the basicity thereof is reduced.

14. An improved process for converting an oil solution of a partially carbonated basic calcium salt of a petroleum sulfonic acid into a non-Newtonian colloidal disperse system comprising the steps of: (1) carbonating said partially carbonated basic calcium salt so as to reduce the basicity thereof; (2) agitating a mixture of the carbonated product of (1) and from about 1% to about 80%, by weight, based on said metal salt of a water-lower alcohol mixture having a weight ratio of from about 1:0.5 to about 1.5, in the presence of a volatile, fluidizing liquid for said disperse system; and (3) carbonating the product of (2) until the basicity thereof is reduced.

References Cited

UNITED STATES PATENTS

| | | | |
|---|---|---|---|
| 3,242,079 | 3/1966 | McMillen | 252—39 |
| 3,242,080 | 3/1966 | Wiley et al. | 252—33 |
| 3,250,710 | 5/1966 | Hunt | 252—33 |
| 3,256,186 | 6/1966 | Greenwald | 252—33 |
| 3,274,135 | 9/1966 | Norman et al. | 260—23 |

DANIEL E. WYMAN, *Primary Examiner.*

IRVING VAUGHN, *Assistant Examiner.*

U.S. Cl. X.R.

71—65; 72—42; 106—11, 14, 15, 33, 273, 274, 277, 281, 285; 167—42; 252—8.7, 18, 18.6, 39